Figure 6:
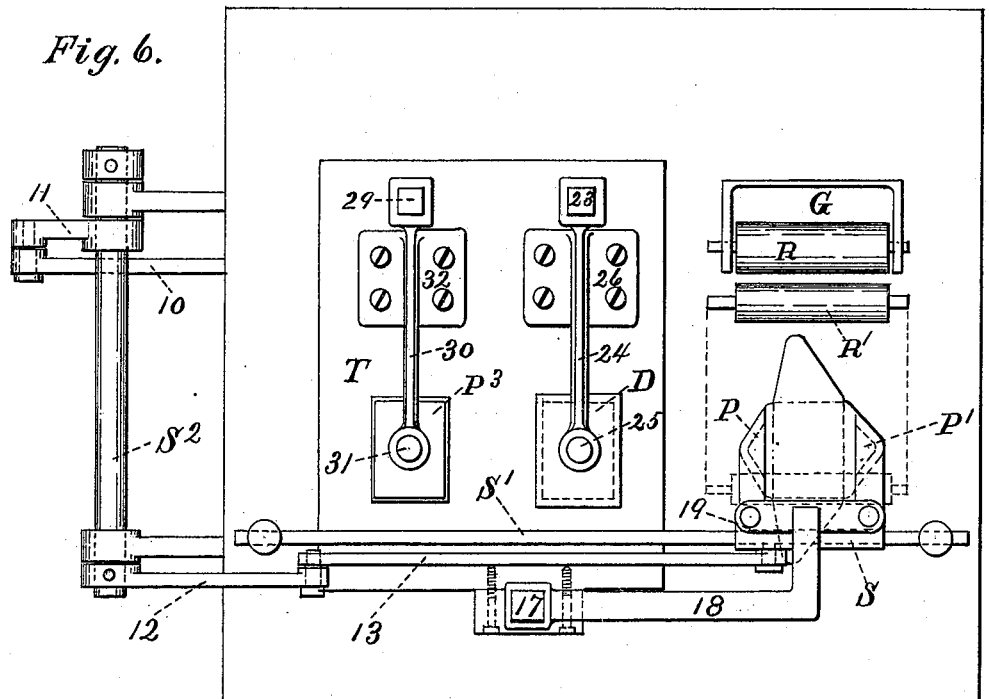

(No Model.) 4 Sheets—Sheet 1.
F. H. RICHARDS.
ENVELOPE MACHINE.
No. 340,250. Patented Apr. 20, 1886.
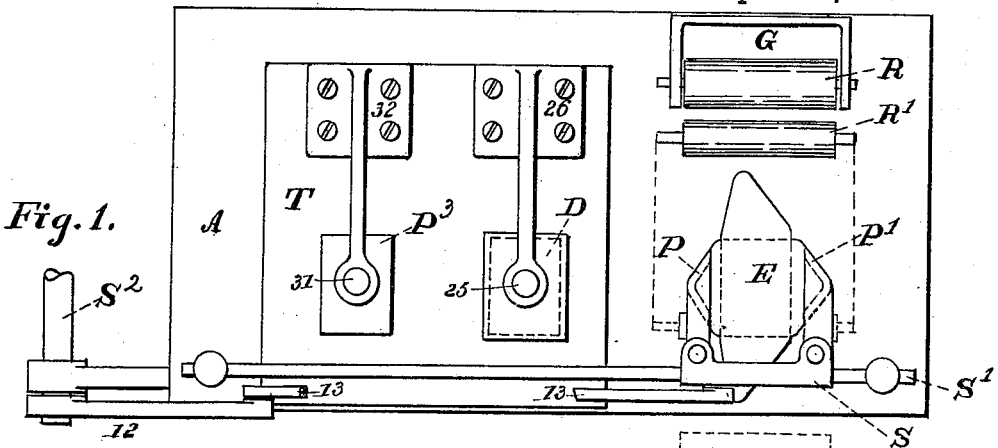
Fig. 1.
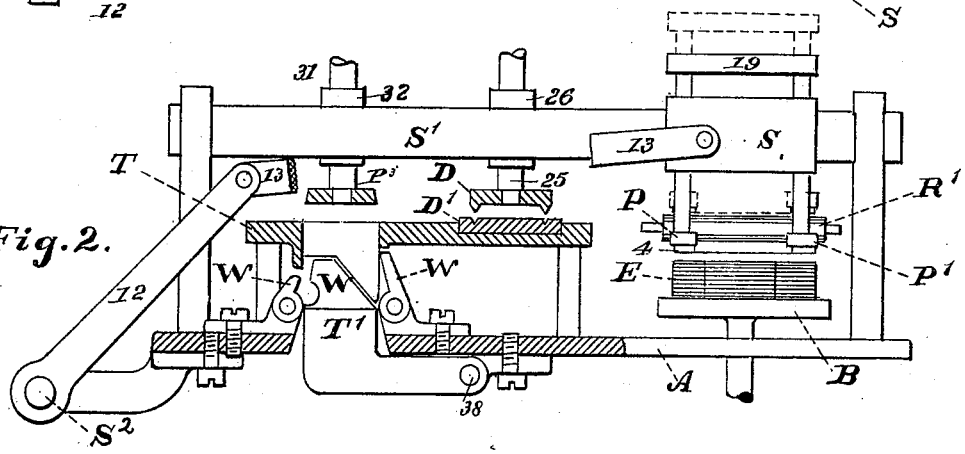
Fig. 2.
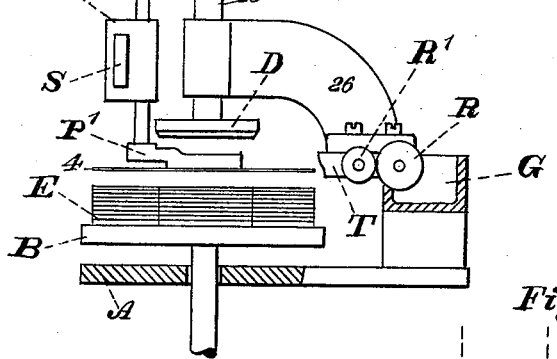
Fig 3.
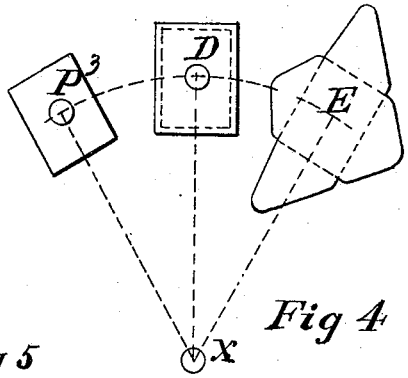
Fig 4.
Fig 5.
Witnesses;
C. O. Palmer.
H. F. L. Orcutt.
Inventor:
Francis H. Richards.
N. PETERS. Photo-Lithographer, Washington, D. C.

(No Model.) 4 Sheets—Sheet 2.

F. H. RICHARDS.
ENVELOPE MACHINE.

No. 340,250. Patented Apr. 20, 1886.

Witnesses:
C. O. Palmer
H. F. L. Orcutt

Inventor:
Francis H. Richards

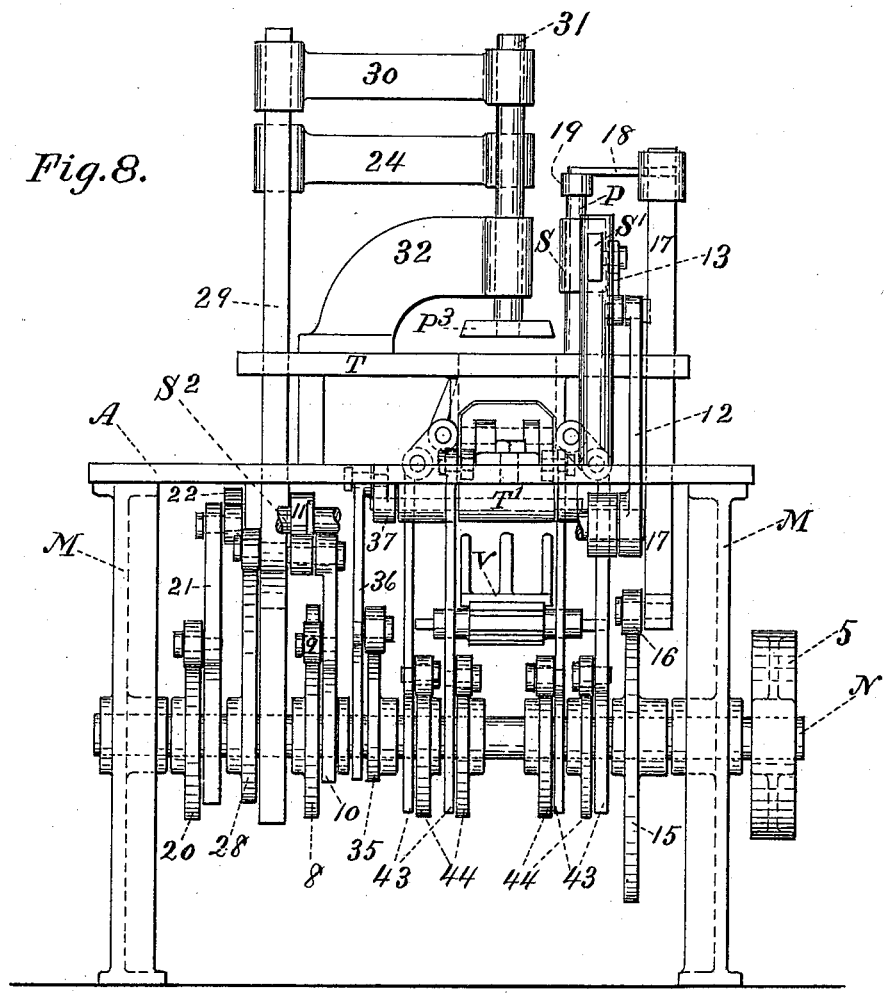

(No Model.) 4 Sheets—Sheet 4.
F. H. RICHARDS.
ENVELOPE MACHINE.
No. 340,250. Patented Apr. 20, 1886.
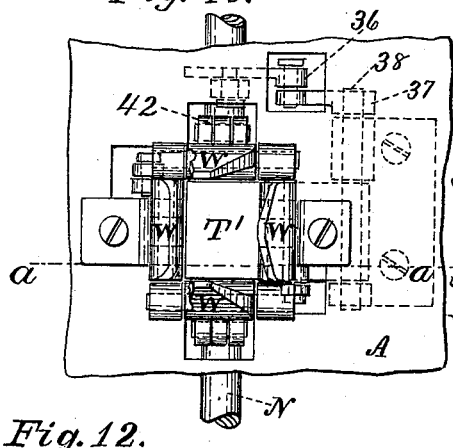
Fig. 10.
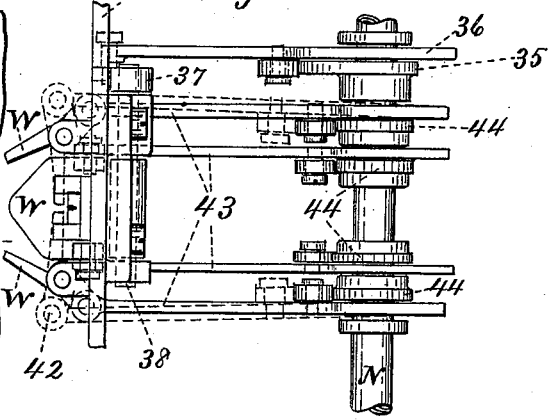
Fig. 11.
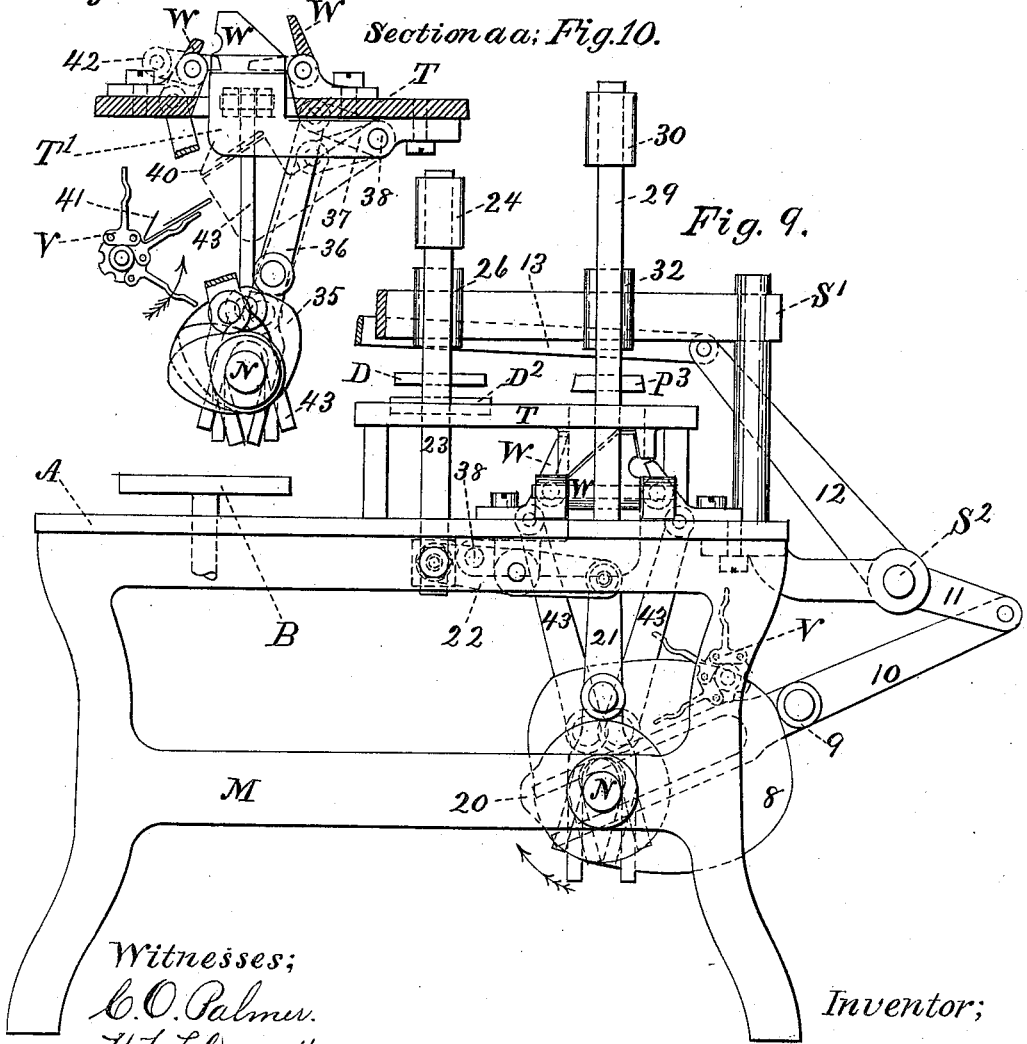
Fig. 12. Section a a; Fig. 10. Fig. 9.
Witnesses:
C. O. Palmer.
H. F. L. Orcutt.
Inventor:
Francis H. Richards.

UNITED STATES PATENT OFFICE.

FRANCIS H. RICHARDS, OF SPRINGFIELD, MASS., ASSIGNOR OF ONE HALF TO THE PRATT & WHITNEY COMPANY, OF HARTFORD, CONN.

ENVELOPE-MACHINE.

SPECIFICATION forming part of Letters Patent No. 340,250, dated April 20, 1886.

Application filed January 28, 1884. Renewed March 13, 1886. Serial No. 195,153. (No model.)

*To all whom it may concern:*

Be it known that I, FRANCIS H. RICHARDS, a citizen of the United States, residing at Springfield, in the county of Hampden and State of Massachusetts, have invented a new and useful Improvement in Envelope-Machines, of which the following is a specification, reference being had to the accompanying drawings, illustrating and forming a part of the same.

My invention relates to machines for making envelopes by a new method, which I will explain before proceeding to a detailed description of the machine.

By the method heretofore adopted in making envelopes with automatic machines, which method and a machine therefor are shown in United States Patent No. 58,327, the ungummed envelope-blanks, previously cut to proper shape, are placed in the machine in a pile, sometimes containing several hundred of them, upon a blank-supporting table, which is shown best in Figs. 1 and 2 of the drawings accompanying that patent. Vertically-reciprocating pickers, having their lower ends of a form corresponding to the surfaces to be gummed, are properly arranged to receive gum from suitable gumming devices, and afterward by descending forcibly upon the pile of blanks to adhere to the uppermost one and lift it upward, holding it at rest a short distance above the pile. While so held a horizontally-reciprocating carrier is slid under the blank and the pickers are pulled off, letting it rest between hooks upon the carrier. Said carrier is then moved to bring the blank directly over a creasing-platform and centrally beneath a vertically-reciprocating plunger of a size corresponding to the size of the opening in said platform and to the size of the folded envelope. While the blank is held in that position by means of the hooks referred to and certain stops that are fixed to the creasing-platform, the plunger descends and carries it down through the platform-opening, whereby the flaps are bent or "broken" in the folding lines, and delivers it upon the folding-table, where the folding operation is completed and the finished envelope is discharged from the folding part of the machine. By that process, after the blank is taken up by the pickers, it is transferred to a carrier for conveyance to the place for the next operation. This transfer being accomplished by means of a simple application of power, the flap having the least area of gummed surface is most quickly released, leaving the opposite side adhering to the picker, thereby drawing the blank out of its proper position, so that the carrier cannot take it. To prevent such a result the gum must be carefully kept of a consistency just sufficient to lift the blank, and still allow the pickers to be easily pulled therefrom, and the motions of the pickers and carrier must be nicely adjusted relative to each other, both as to time, velocity, and extent of movement. With the greatest care in all these particulars the displacement and consequent spoiling of blanks by the failure of the machine to properly transfer them from the pickers to the carrier are both frequent and troublesome.

It is, therefore, the first object of my invention to provide an envelope-machine the operation of which shall not involve any transfer of the blank from the pickers to a carrier, and which will therefore avoid the difficulties arising from such transfer. By the above-described method, after the blank has been transferred from the pickers to the carrier it is conveyed by the latter beneath a creasing-plunger, which operates by a downward stroke in conjunction with a suitable opening in the creasing-table to first "break" or forcibly bend the blank at the lines where the fold is to be made, and then forces the blank thus broken down between the usual folding-wings onto the folding-table. During this operation the blank is held in place by stops until the plunger enters the opening of the creasing-table, after which the angle of the bend at that moment made therein is relied upon to retain said blank in proper position relative to said plunger during the remainder of its downward stroke. If, during its passage from the former to the latter position, those angles not being formed perfectly enough to so retain it, the blank moves laterally beneath the plunger it will be left in the folding-box in an improper position, so that the folding-wings cannot fold the flaps correctly, thereby not only spoiling that envelope but frequently getting gum upon the mechanism, which spoils others and is troublesome to remove. With some kinds of paper, especially such as have considerable elasticity and do not crease easily by bending, these difficulties are very serious, causing a considerable loss of time and material.

It is, therefore, the second object of my invention to provide an envelope-machine in which the determination of the folding-lines of the blank shall not depend upon the plunger whereby that blank is driven into the folding-box and which will, therefore, avoid the difficulties arising from the imperfect action of said plunger in that respect.

For the attainment of these objects, my invention consists in the devices and combinations hereinafter described and claimed.

The essential elements of my improved machine are illustrated by the first four figures, of which—

Figure 7:
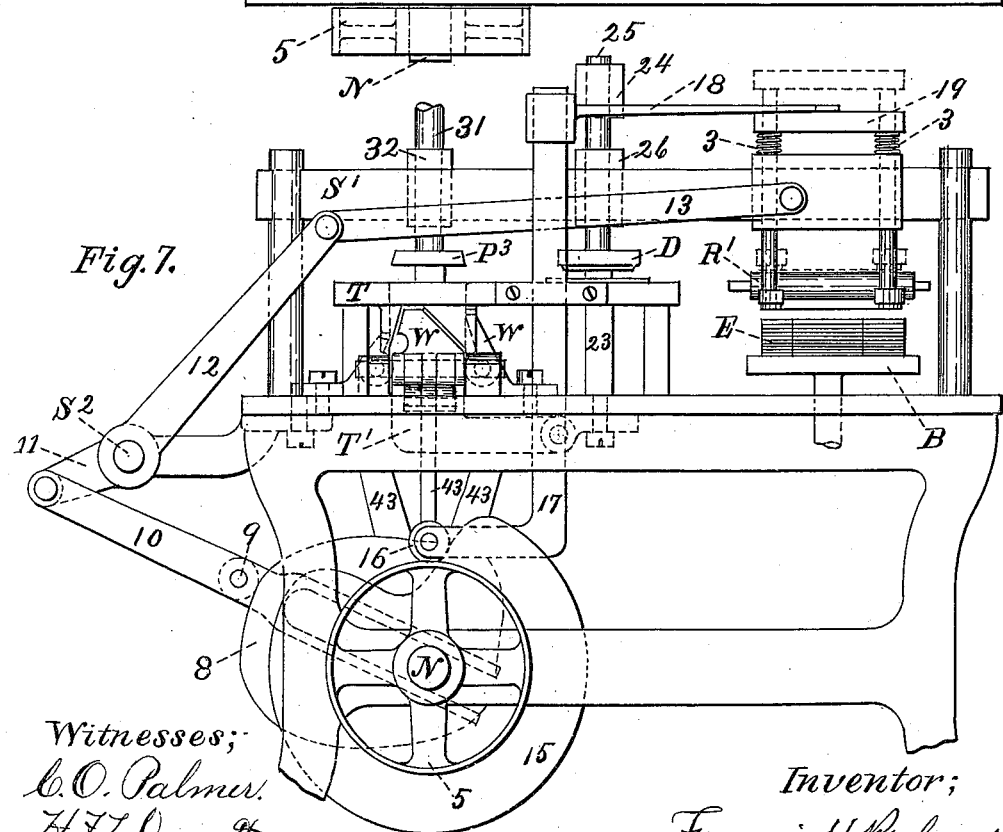

Figure 1 is a plan view of so much of said machine as embodies these elements; Fig. 2, an end elevation, partially in section, of the same; Fig. 3, an elevation of the front side, which is at the right hand in Figs. 1 and 2; and Fig. 4, a diagram showing how the arrangement of certain parts may be modified by arranging them about an axis, X, instead of in a straight line, as in Figs. 1 and 2. Fig. 5 is a cross-sectional end view of an envelope-blank after it has been acted upon by the blank-creasing mechanism. In the last seven figures, I have shown an envelope-machine embodying the aforesaid elements, and one arrangement of ordinary cams and connections for operating them. Fig. 6 is a plan view of the machine. Fig. 7 is an end elevation drawn in projection with Fig. 6. Fig. 8 is a rear elevation. Fig. 9 is an end elevation, opposite to Fig. 7, and with some parts broken away. Fig. 10 is a plan view of the folding mechanism. Figs. 11 and 12 are respectively side and sectional end views of this mechanism, each view being drawn in projection with Fig. 10.

Similar characters designate the same parts in all the figures.

In proceeding to the description of my improved envelope-machine I will first explain the construction and operation of the essential elements thereof and afterward refer to the mechanism shown for operating them. The said elements comprise, first, a blank-supporting mechanism of the usual description, having such suitable blank-guides and blank-separating devices as may be required; second, a picker mechanism arranged to take up a blank, and, while still firmly adhering thereto, to convey the same laterally, first, to a creasing mechanism and then to a folding mechanism; third, picker-gumming mechanism of the ordinary description; fourth, a creasing mechanism adapted to crease the folding-lines of the blank; fifth, a folding mechanism adapted to take the creased blank from the pickers and fold the same. It will be understood that each of these elements is supposed to comprise such minor and supplementary parts as are ordinarily employed in or with similar elements in other machines of this or other classes.

In the drawings, A designates the usual top plate of an envelope-machine for carrying the several mechanisms required for carrying out the method of manufacture.

B is the table of any suitable blank-supporting mechanism, and is provided with the usual appliances (not shown) for retaining and separating the blanks E carried thereon.

One or more pickers, P and P', of substantially the usual description, are carried by the laterally-movable picker-holder S, and arranged to be reciprocated vertically in said holder over the blanks in the usual manner. When at their uppermost position, as shown by dotted lines in Fig. 2, gum is applied to their under surfaces by means of the usual gumming-roll, R', that receives gum from the roll R of the box G, and is operated to pass under the pickers by means of the usual actuating devices. For supporting and operating said roll R', I prefer to employ the mechanism which is shown and described in United States Patent No. 221,835, dated November 18, 1879, for operating the roll designated by I in said patent. After the gum is applied to them and the roll R' is returned to its position in Fig. 3, the pickers are forcibly pushed down (compressing springs 3) upon the pile of blanks, and, adhering to the uppermost one, lifts it to the position shown at 4 in Figs. 2 and 3.

Thus far the construction and the operation of the mechanism described for carrying my improved method into effect are or may be substantially the same as heretofore used for the old process hereinbefore briefly described; but at this point my method departs from the old one by the leaving out of one of the steps thereof, which step is the transfer of the blank from the pickers to a carrier. The blank having been raised to the position described, the picker-holder S is made to move upon guide S' or to swing upon a pivot, as in Fig. 4, when that arrangement is used, until the said blank is in proper position between the upper and lower creasing dies, D and D', respectively, to have its folding-lines creased thereby, when the said dies are forcibly brought together, thereby accurately determining the place of said folding-lines upon and impressing the same into the said blank, as illustrated in Fig. 5, in which I I designate the creases of the blank before folding. These dies being now opened, the motion of the pickers is continued until the blank is in a proper position to be taken from them by the folding mechanism, that position being reached when the creased lines formed by said dies correspond with the periphery of plunger $P^3$, and with the opening in the plate T that is directly beneath that plunger. The plunger $P^3$ then descends upon the blank, pulling its flaps from the pickers and pushing it down into the folding-box and onto the folding-bed T', whereon it is folded by means of the usual folding-wings, as W, Fig. 2. The completed envelope is then disposed of in the usual manner, and the pickers returned to their original position, ready for a repetition of the entire operation. It will now be clear how that by my improved machine the making of an envelope begins and ends with the taking of the same steps as does the old method hereinbefore described—that is to say, it begins by the taking up of a blank from a pile of blanks by means of pickers made adhesive upon their under surfaces by the previous application thereto of a suitable gum, and it ends by the delivering of that gummed blank to the folding mechanism and the folding of said blank thereby, it being the intermediate steps of the operation where improvement is made; and it will also be obvious how this improved method obviates the difficulties arising in the old one from the transfer of the blank to a carrier and the imperfect operation of the creasing-plunger. It also has the advantage of operating more gradually and uniformly upon the fiber of the paper at the folding-lines, bending rather than "breaking" the fiber, and making the envelopes to have a much smoother edge than by the old way. By this means I am enabled to make perfect smooth-edged envelopes from paper naturally quite brittle, that would otherwise make them with their edges "ragged" and imperfect.

I prefer to make one of the creasing-dies, preferably the lower one, D', of some yielding material—as leather—or of a rigid material covered with a thin layer or "blanket" of soft rubber or similar substance, whereby the said dies may be more easily made to each exactly fit the other, and to operate with equal effect upon blanks of varying thickness.

It will be observed that as in my machine the folding-lines are distinctly impressed into the blank by means of dies especially adapted therefor, the plunger $P^3$ ceases to be a "creasing-plunger," as in the old machines, and becomes merely a pushing-plunger for pushing the creased blank down between the folding-wings, having no longer any influence in determining the position in the blank of the folding-lines.

Having now described the mechanisms comprising the principal elements of my invention, I will next describe the actuating devices which I have in this instance adopted for operating those elements. Again referring to the drawings, M M designate the end frames, which support the top-plate and carry the cam-shaft N, which shaft is driven by means of any suitable pulley, 5. On this shaft is fixed a set of cams, which are to be suitably shaped and arranged to actuate the several mechanisms as may be required in any particular case. The cam for actuating roller R' is not shown, but is to be such as now commonly used for that purpose, whose operation will be understood from the above specified Letters Patent, wherein two gum-boxes are shown, as may be used in my present machine. The blank-supporting table B may be adjusted vertically from time to time by hand, or operated automatically by a suitable mechanism. For this purpose I may use a mechanism substantially as shown in United States Patent No. 221,835, dated November 18, 1879; or I may use the blank-feeding mechanism described and claimed in my United States Patent, No. 284,483, dated September 4, 1883. The picker-holder S is moved horizontally on a guide, S', by means of a cam, 8, acting on roll 9, through rod 10, arm 11, shaft $S^2$, arm 12, and rod 13. The cam must of course be suitably shaped to impart through these parts the required movements to said holder. The pickers are operated vertically in the holders S by means of a cam, 15, acting on roll 16 through slide 17, provided with an arm, 18, (preferably slightly elastic,) onto bar 19, which is secured to the upper end of said pickers. Springs 3, between that bar and the holder S, serve to raise the pickers to their normal position. (Shown by dotted lines in Fig. 2.) The upper creasing-die, D, is operated by cam 20, acting through rod 21, lever 22, slide 23, and arm 24 onto spindle 25, which is carried in bracket 26 and is fixed to said die. This apparatus is arranged to give a downward movement to the die, which is lifted by a spring, that is not shown. The pushing-plunger $P^3$ is operated by cam 28, slide 29, arm 30, and spindle 31, which spindle is carried in bracket 32 and secured to said plunger. Said cam is arranged to lift the plunger, which is brought down by gravity or by a spring. The folding-bed T' is operated by cam 35, rod 36, arm 37, and rock-shaft 38. An envelope having been folded, the bed is lowered by the cam, when the envelope at 40 slides off into the endless apron V, as shown at 41, Fig. 12.

For operating the folding-wings W, which wings are or may be such as shown in United States Patent No. 58,327, dated September 25, 1866, each folding-wing has an arm, as 42, Figs. 10, 11, and 12, which is operated by a rod, 43, from a cam, 44, on shaft N. These parts serve to open or close the said wings, or both, as may be arranged, springs (not shown) being provided to perform the return movement in case the cams are, as herein shown, of the single-acting variety.

It should be understood that a blank-taking or blank-carrying picker is not necessarily one provided with gum. In some cases it may just as well be one which lifts the blank by suction, of which kind numerous examples are shown and described in prior patents. In my first claim I have claimed a combination in which the picker may be of this description, unless the envelope-blank is to be gummed. This, however, is not always the case, for some styles of envelopes are, it will be remembered, closed by means of a non-adhesive "tuck" or flap, which enters an opening made to receive it.

Having thus described my invention, I claim—

1. The combination, in an envelope-machine, of a blank-supporting table, a blank-folding mechanism, a blank-creasing mechanism situated between said table and folding mechanism, a blank-taking picker, and means, substantially as described, for operating said picker to take a blank from said table and present it first to the creasing and then to the folding mechanism, substantially as set forth.

2. The combination, in an envelope-machine, of a blank-supporting table, blank-creasing mechanism, blank-folding mechanism, a blank-carrying picker adapted to travel in a course from said table first to said creasing-mechanism and then to folding mechanism, and means, substantially as described, for applying gum to said picker, substantially as set forth.

3. The combination, in an envelope-machine, of a blank-creasing mechanism, a blank-folding mechanism, and means, substantially as described, for presenting blanks first to said creasing mechanism and then to said folding mechanism, substantially as set forth.

4. The combination, in an envelope-machine, of a blank-supporting table, a blank-creasing mechanism having a movable upper die, a blank-folding mechanism, a picker-holder traveling from said table to said mechanisms at one side thereof, a vertically-reciprocating picker carried by its stem in said holder, said picker being formed at one side of its stem and arranged to pass under said upper die, and means, substantially as described, for operating said holder and picker, substantially as set forth.

FRANCIS H. RICHARDS.

Witnesses:
H. F. L. ORCUTT,
C. O. PALMER.